(12) United States Patent
Beghein

(10) Patent No.: US 6,925,295 B1
(45) Date of Patent: Aug. 2, 2005

(54) OFFSET CANCELLATION SYSTEM FOR A COMMUNICATION SYSTEM RECEIVER

(75) Inventor: Christophe C. Beghein, Kent (GB)

(73) Assignee: Analog Devices, Inc., Norwood, MA (US)

( * ) Notice: Subject to any disclaimer, the term of this patent is extended or adjusted under 35 U.S.C. 154(b) by 375 days.

(21) Appl. No.: 10/226,986

(22) Filed: Aug. 23, 2002

Related U.S. Application Data

(60) Provisional application No. 60/315,620, filed on Aug. 29, 2001.

(51) Int. Cl.[7] .................................................. H04B 1/16
(52) U.S. Cl. ....................... 455/334; 455/130; 455/323; 455/317; 375/319
(58) Field of Search ................................ 455/334, 130, 455/323, 317, 126, 296, 311–313, 136, 266, 324, 295, 390, 391, 239.1, 395, 196.1, 303–306; 375/319, 395, 324, 344, 316, 346

(56) References Cited

U.S. PATENT DOCUMENTS

| | | | | |
|---|---|---|---|---|
| 6,021,156 A | * | 2/2000 | Wagner | 375/148 |
| 6,175,728 B1 | * | 1/2001 | Mitama | 455/323 |
| 6,504,498 B1 | * | 1/2003 | O'Brien | 341/143 |
| 6,516,185 B1 | * | 2/2003 | MacNally | 455/234.1 |
| 6,535,725 B2 | * | 3/2003 | Hatcher et al. | 455/317 |
| 6,700,514 B2 | * | 3/2004 | Soltanian et al. | 341/118 |
| 2003/0181188 A1 | * | 9/2003 | Darabi | 455/313 |
| 2003/0194984 A1 | * | 10/2003 | Toncich et al. | 455/323 |
| 2003/0199264 A1 | * | 10/2003 | Holenstein et al. | 455/324 |
| 2004/0077326 A1 | * | 4/2004 | Shi | 455/313 |
| 2004/0176055 A1 | * | 9/2004 | Vepsalainen et al. | 455/130 |
| 2004/0229580 A1 | * | 11/2004 | Chen | 455/130 |
| 2004/0247046 A1 | * | 12/2004 | Hsiao | 375/319 |

* cited by examiner

*Primary Examiner*—Pablo N. Tran
(74) *Attorney, Agent, or Firm*—Gauthier & Connors, LLP

(57) ABSTRACT

A receiver circuit is disclosed for use in a communication system. The receiver circuit includes a forward path with a channel selection filter and a feedback path. The output of the channel selection filter is provided to an output device. The feedback path includes a feedback filter and a mixer. The input of the feedback filter is coupled to the output of the channel selection filter and the output of the feedback filter is coupled to a first input of the mixer. The second input of the mixer is coupled to a multi-frequency signal generator, and the output of the mixer is coupled to the forward path of the receiver circuit.

18 Claims, 5 Drawing Sheets

OFFSET CANCELLATION SYSTEM FOR A COMMUNICATION SYSTEM RECEIVER

This application claims priority to U.S. Provisional Patent Application Ser. No. 60/315,620 filed Aug. 29, 2001.

BACKGROUND OF THE INVENTION

The present invention relates to receivers for communication systems, and particularly relates to radio frequency receivers that include a signal filter for isolating a communication signal.

Conventional communication systems typically include a transmitter, a communication channel and a receiver. Many communication channels generally operate more efficiently when a relatively high frequency communication signal is being transmitted. Receivers in such communication systems, therefore, typically down-convert the received signal to a relatively lower frequency for signal processing. Most such receivers also include a filter for removing system noise and/or signals other than a particular communication signal of interest. In many systems, the received filtered communication signal of interest is relatively weak, and most such receivers, therefore, further include an amplifier for amplifying the received filtered communication signal of interest.

A conventional communication signal receiver includes a high-gain channel selection filter that provides selective filtering as well as high gain amplification. A difficulty with such receivers, however, is that the circuit offset may merge with the signals or saturate the circuit after significant amplification. Although one approach to correcting for this is to provide AC coupling of the filter output, for example by connecting an offset-free high-pass filter in cascade with a conventional filter, there are disadvantages to such an approach. First, the offset will remain inside the filter itself, leading to loss of dynamic range or even saturation. Second, since the signal will be required to travel through the high-pass filler in addition to the other components, the signal may be further degraded or distorted, e.g., the signal-to-noise ratio and distortion may be compromised.

Another approach involves employing a low pass filter in a feedback path that provides inverted offset to the input of the channel selection filter. For example, as shown in FIG. 1, such a receiver 10 includes a combiner 12 that combines an input signal with a feedback signal and produces a combined signal that is input to a first low pass filter 14. The output of the first low pass filter 14 is fed back to the combiner 12 after passing through a second low pass filter (e.g., an integrator) 16, and may also be provided to an analog to digital converter 18 for processing. The use of a first low pass filter 14 in the forward path and a second low pass filter 16 in the feedback path provides the equivalent of a bandpass filter. In order to achieve the low frequency high-pass corner on a very high gain channel selection filter, however, the size of components in the feedback path is large. In some cases, this requires that some components of the feedback path not be included on the chip itself, and instead be located off-chip, leading to reduced attractiveness of the chip. Moreover adding an offset correction loop may also contribute to additional noise in the receiver signal.

There is a need, therefore, for a receiver circuit that may achieve the above objectives without significant disadvantages, such as large component sizes and noise addition.

SUMMARY OF THE INVENTION

A receiver circuit is disclosed for use in a communication system. The receiver circuit includes a forward path with a channel selection filter and a feedback path. The output of the channel selection filter is provided to an output device. The feedback path includes a feedback filter and a mixer. The input of the feedback filter is coupled to the output of the channel selection filter and the output of the feedback filter is coupled to a first input of the mixer. The second input of the mixer is coupled to a multi-frequency signal generator, and the output of the mixer is coupled to the forward path of the receiver circuit.

BRIEF DESCRIPTION OF THE DRAWINGS

The following description may be further understood with reference to the accompanying drawing in which.

The drawings are shown for illustrative purposes only.

DETAILED DESCRIPTION OF THE ILLUSTRATED EMBODIMENT

Figure 1:
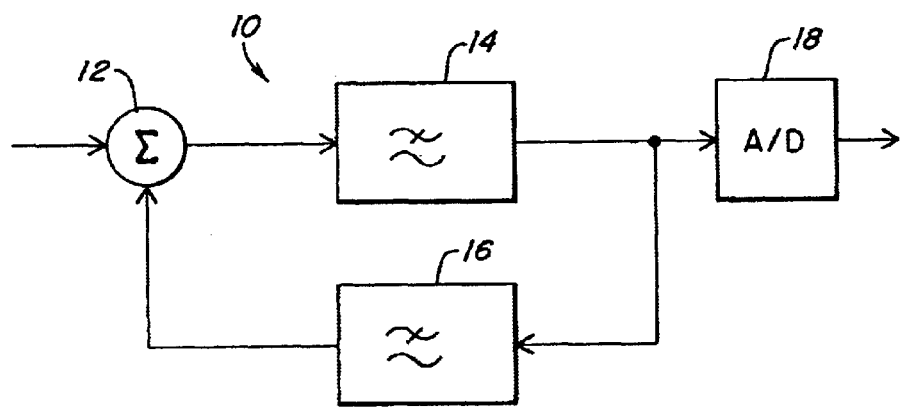
FIG. 1 shows an illustrative diagrammatic view of a portion of a prior art receiver circuit.
Figure 2:
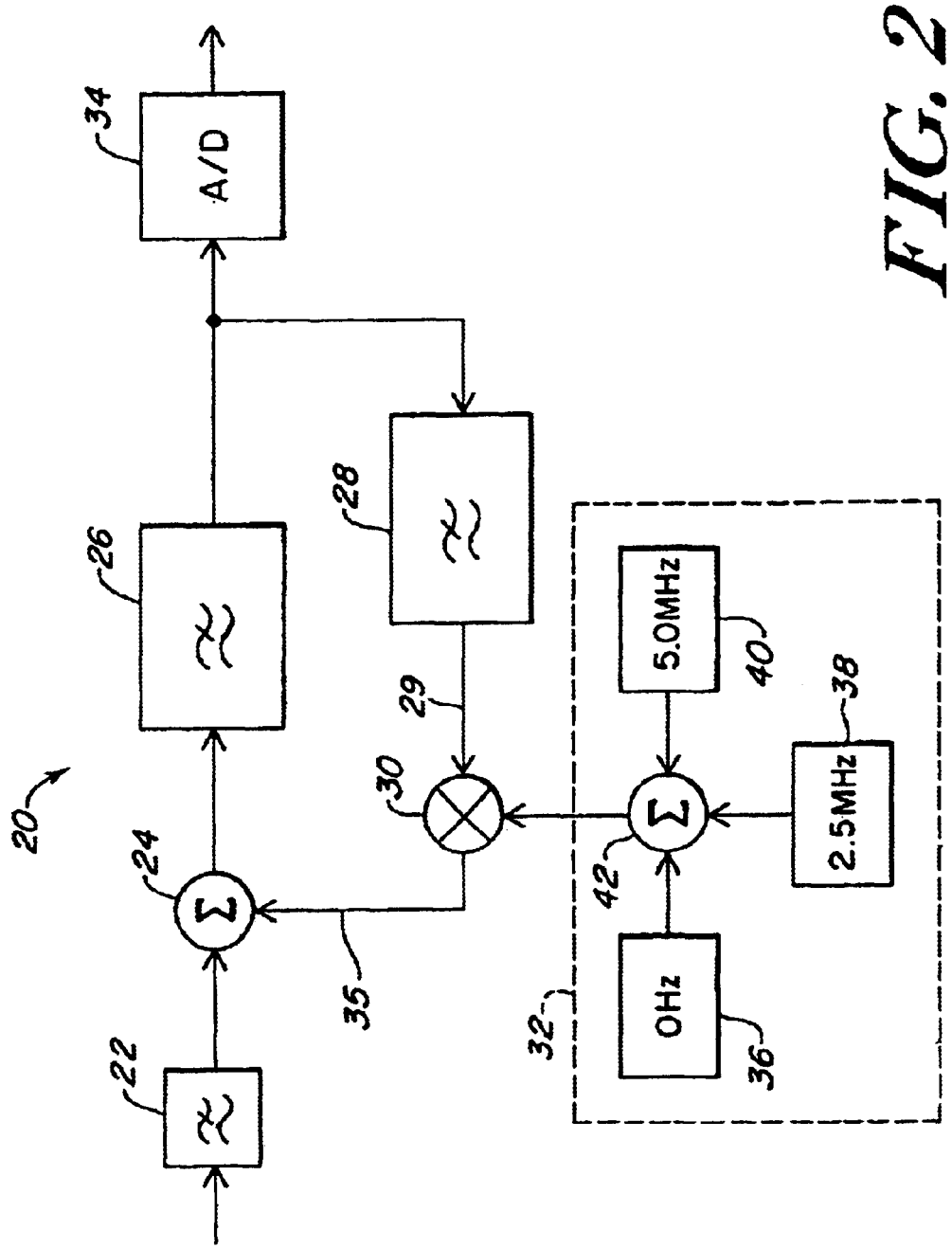
FIG. 2 shows an illustrative diagrammatic view of a receiver circuit in accordance with an embodiment of the invention.

In an embodiment, a system of the invention employs discrete-time circuits such as switched-capacitor circuits sampling at 10 MHz. The feedback path samples at a lower frequency to reduce it's gain. As shown in FIG. 2, receiver circuit 20 in accordance with an embodiment of the invention includes a combiner 24, a first low pass filter 26, a second low pass filter 28, and a mixer 30 that is coupled to multi-tone signal generator 32 wherein a multi-tone signal is formed of three tones at 0 Hz, 2.5 MHz and 5.0 MHz in a sample data system that samples at 10 MHz. Such a multi-tone signal is easy to create: it can be a clock with a non-50% duty cycle. The output of this signal generator is provided to the mixer 30 as represented mathematically in FIG. 2. In further embodiments, the circuit may include an anti-aliasing low pass filter 22 that is coupled to the received signal and to the input of the combiner 24.

During use, a received signal is combined with a multi-tone offset correction signal 35 at the combiner 24. The output signal of the combiner 24 is filtered by the first low pass filter 26 (such as a 10 MHz switched capacitor filter), and output of the filter 26 is provided to an analog to digital converter 34 for signal processing. The output of the filter 26 is also fed back via a second low pass filter 28. The output 29 of the filter 28 is mixed with the multi-tone signal by the mixer 30, and the output of the mixer 30 is provided to the combiner 24. The multi-tone signal may be produced by a clock generator that is able to provide a non-50% duty cycle.

In addition, the circuit provides that sub-sampling may be used on the low pass filter 28.

Although sub-sampling may result in a loss of signal information (aliasing) in some conventional systems, in this case, the forward path is a channel selection filter so it also acts as an anti-aliasing filter for the sub-sampling. The solution is provided, therefore, by having the feedback path sub-sampling down to a frequency that is still in the stop-band of the forward filter 26. In an embodiment, the filter 28 may be a switched capacitor very-large-time-constant integrator with offset compensation.

The use of mixing at the output provides that the low frequency offset correction signal may be spread over a wider band, discarding a portion of the offset correction signal into the stop-band of the channel selection filter. A set of switches may be used to up-convert a significant part of the offset correction signal to frequencies in the stop-band of the main filter. This requires no extra hardware and the action of attenuation of the offset correction signal also applies to the noise from the offset correction loop. The system may be employed with both continuous-time and switched capacitor channel selection filters. This solution, therefore, provides two benefits: it attenuates the gain of the feedback path and simultaneously reduces its noise.

Figure 3:
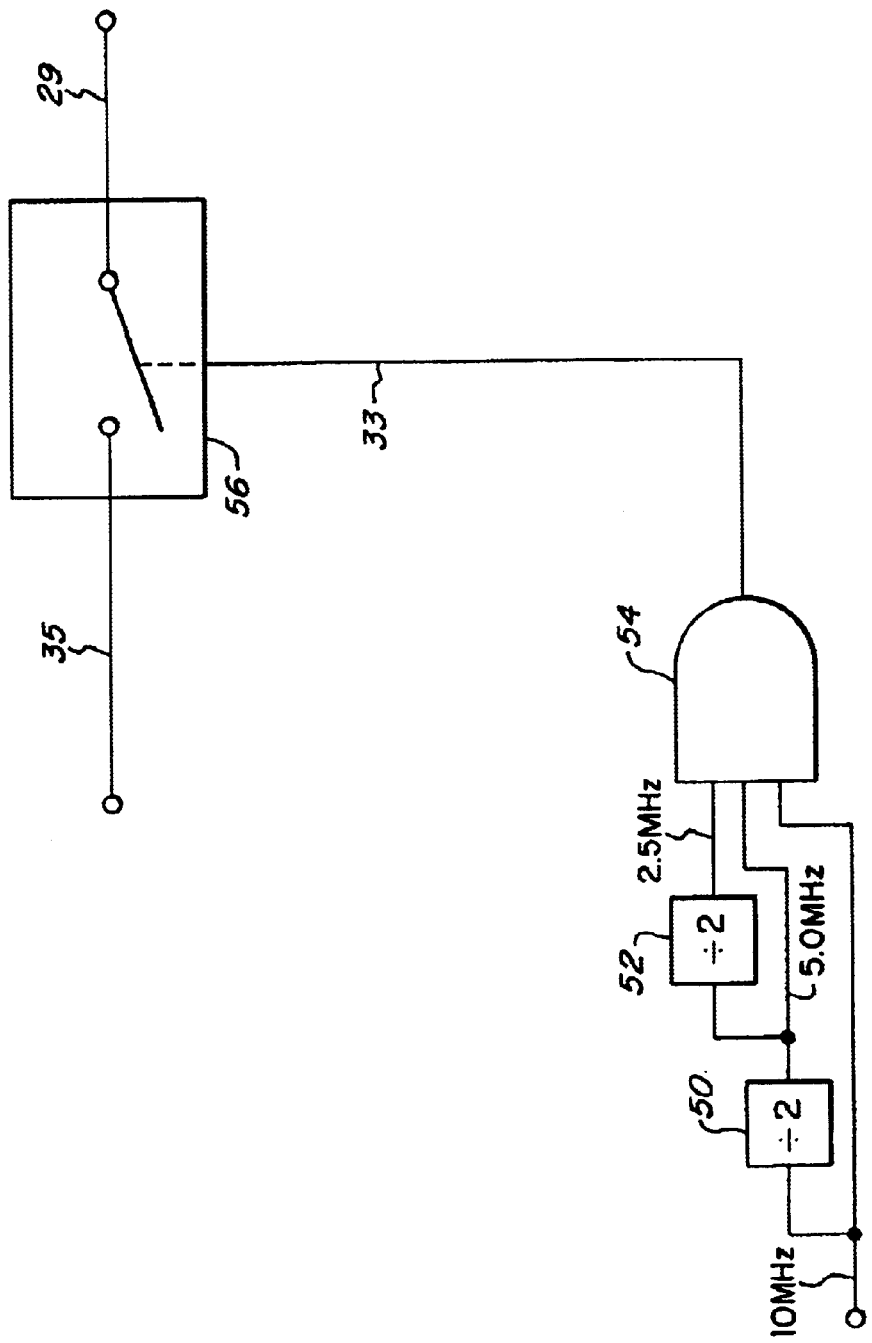
FIG. 3 shows an illustrative diagrammatic view of a multi-tone signal generator and mixer in accordance with an embodiment of the invention.

As shown in FIG. 3, a multi-tone signal generator and mixer in accordance with an embodiment of the invention includes a pair of frequency dividers 50 and 52, an AND gate 54, and a switch 56 that is controlled by the output of the AND gate 54. The multi tone input signals to the AND gate 54 are produced by passing a 10 MHz signal through the first frequency divider 50 to produce a 5.0 MHz signal. The output of the divider 50 is passed through the second frequency divider 52 to produce a 2.5 MHz signal. The 10. MHz, 5.0 MHz and 2.5 MHz signals are combined by the AND gate 54 to produce the multi-tone signal 33. This multi-tone signal has a 25% duty cycle and a period of 400 msec. The multi-tone signal 33 controls the switch 56 such that the signal 29 from the filter 28 is coupled to the input of combiner 24 for 100 msec for every 400 msec period (25% duty cycle), thus providing the multi-tone offset correction signal 35.

Figure 4:
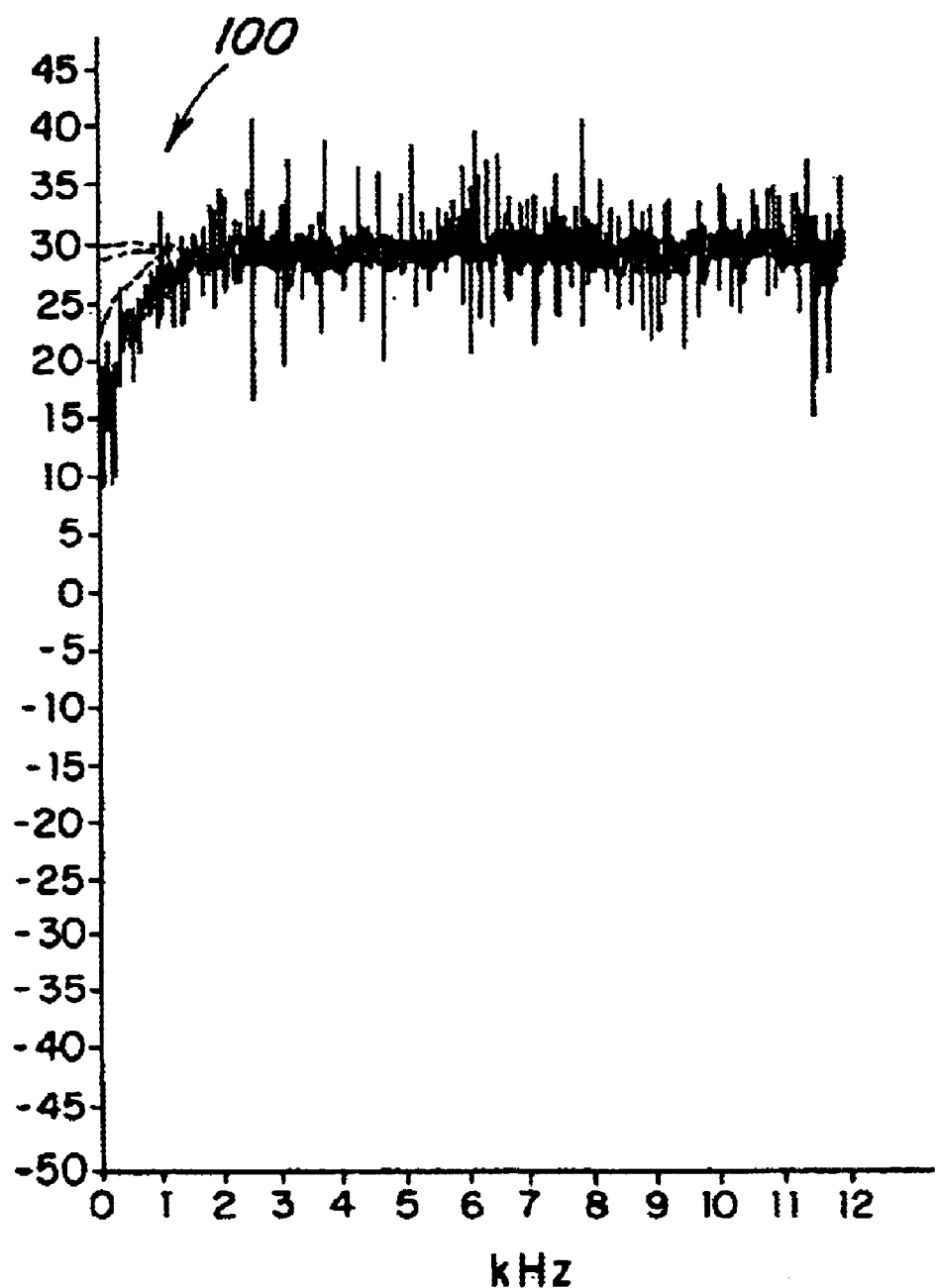
FIG. 4 shows an illustrative diagrammatic view, zoomed on the high-pass corner, of the transfer function of a circuit of FIG. 2 with the frequency along the horizontal axis and gain along the vertical axis.
Figure 5:
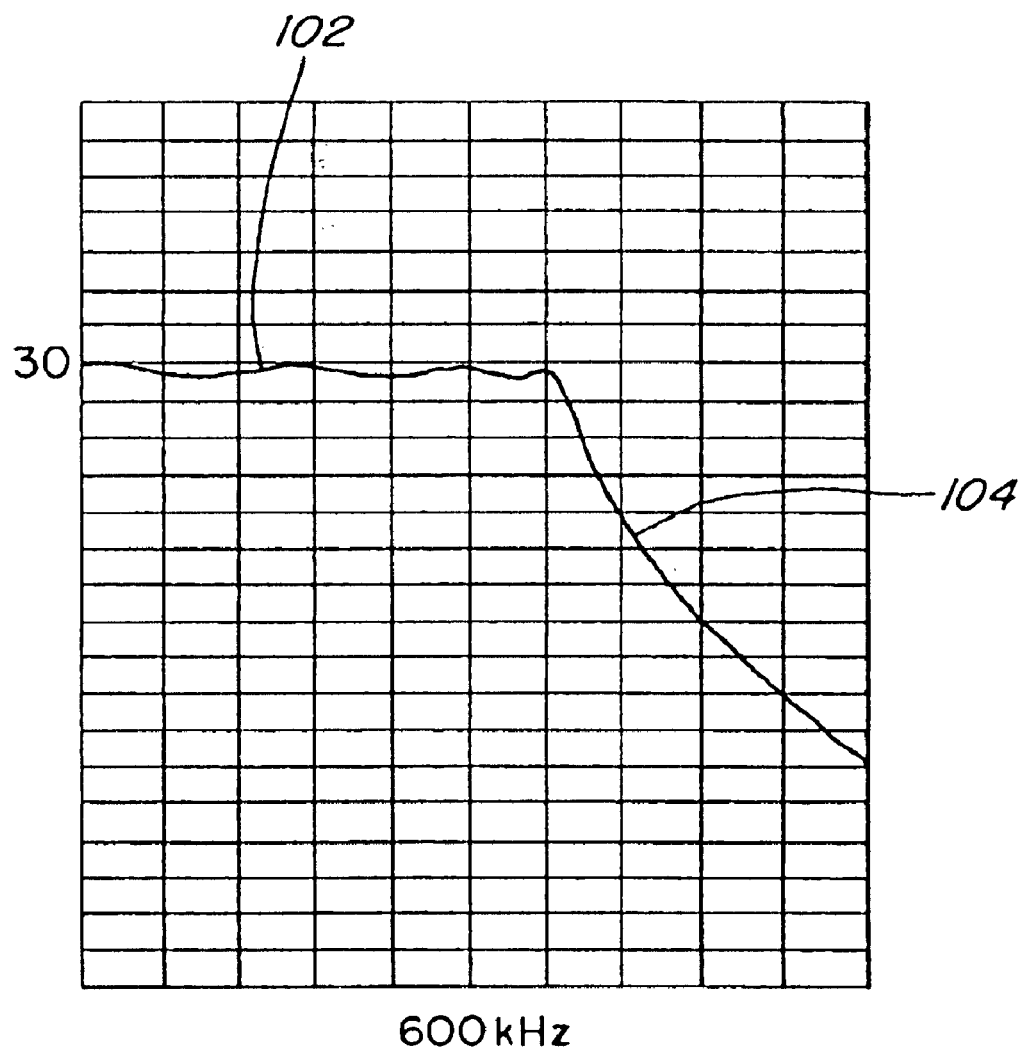
FIG. 5 shows an illustrative graphical view of the output of the A/D converter of the circuit of FIG. 2 with the, frequency along the horizontal axis and output gain along the vertical axis.

In another example of a system of the invention, the sub-sampling is set to 4, and a clock (which has a 25% duty cycle) provides 0 Hz, 2.5 MHz and 5.0 MHz tone signals in a sample data system that samples at 10 MHz. The transfer function (in the frequency domain) provides a high pass corner at the very low frequency of about 1 kHz. as shown at 100 in FIG. 4. As shown in FIG. 5, the transfer function at the output of the analog to digital converter provides that the properties of the forward filter ($7^{th}$ order Chebichev with gain of 30 dB and cutoff of 600 kHz.) may be held unaffected, as shown at 102 and 104 in FIG. 5 despite the introduction of the mixer 30 with the feedback path. Note that the spurious tone introduced by the multi-tone signal do not appear because they fall in the attenuation portion of the forward filter as shown at 104 in FIG. 5.

Those skilled in the art will appreciate that numerous modifications and variations may be made to the above disclosed embodiments without departing from the spirit and scope of the invention.

What is claimed is:

1. A receiver circuit for use in a communication system, said receiver circuit comprising:
   a forward path including a forward filter, the output of the forward filter being provided to an output device; and
   a feedback path including a feedback filter and a mixer, the input of the feedback filter being coupled to the output of the forward filter and the output of the feedback filter being coupled to a first input of the mixer, the second input of the mixer being coupled to a multi-tone signal, and the output of the mixer being coupled to the forward path.

2. The receiver circuit as claimed in claim 1, wherein said multi-tone signal includes a 0 Hz spectral component.

3. The receiver circuit as claimed in claim 1, wherein said multi-tone signal provides multiple tones that are equally spaced from one another.

4. The receiver circuit as claimed in claim 1, wherein said forward filter is a low pass filter.

5. The receiver circuit as claimed in claim 1, wherein said feedback filter is a low pass filter.

6. A receiver system for use in a communication system, said receiver system comprising:
   input means for receiving an input signal;
   first low pass filter means for providing channel selection filtering of said input signal and providing an output signal;
   second low pass filter means for filtering the output signal and providing an offset output signal; and
   mixer means for mixing said offset output signal with a multi-tone signal and providing an offset correction signal to said input means.

7. A receiver system as claimed in claim 6, wherein said first low pass filter means includes a switched capacitor filter.

8. A receiver system as claimed in claim 6, wherein said second low pass filter means includes a switched capacitor filter.

9. A receiver system as claimed in claim 8, wherein said switched capacitor filter sub-samples the output signal.

10. The receiver circuit as claimed in claim 6, wherein said multi-tone signal includes a 0 Hz spectral component.

11. The receiver circuit as claimed in claim 6, wherein said multi-tone signal provides multiple tones that are equally spaced from one another.

12. A receiver circuit for receiving radio frequency communication signals, said receiver circuit comprising:
    an input filter that receives an input signal;
    a combiner that combines the input signal and a feedback signal, and produces a combined input signal;
    a channel selection filter that receives the combined input signal and produces an output signal;
    a low pass filter that receives the output signal and produces a low pass filtered output signal; and
    a mixer that receives a multi-tone signal and the low pass filtered output signal and produces the feedback signal that is provided to the first combiner.

13. The receiver circuit as claimed in claim 12, wherein said multi-tone signal includes a 0 Hz spectral component.

14. The receiver circuit as claimed in claim 12, wherein said multi-tone signal provides multiple tones that are equally spaced from one another.

15. A receiver system for use in a communication system, said receiver system comprising:
    input means for receiving an input signal;
    first low pass filter means for providing channel selection filtering of said input signal and providing an output signal;
    second low pass filter means for filtering the output signal and providing an offset output signal; and
    means for receiving said offset output signal and for providing a pulsed offset signal to said input means.

16. A receiver system as claimed in claim 15, wherein said first low pass filter means includes a switched capacitor filter.

17. A receiver system as claimed in claim 15, wherein said second low pass filter means includes a switched capacitor filter.

18. A receiver system as claimed in claim 17, wherein said switched capacitor filter sub-samples the output signal.

* * * * *